United States Patent
Seifried et al.

(10) Patent No.: US 10,485,152 B2
(45) Date of Patent: Nov. 26, 2019

(54) SOIL-WORKING SYSTEM

(71) Applicants: BETEK GMBH & CO. KG, Aichhalden (DE); KUHN HUARD S.A., Chateaubriant (FR)

(72) Inventors: Fabian Seifried, Herrenzimmern (DE); Ulrich Kraemer, Wolfach (DE); Florian Smeets, Dossenheim (DE); M. Guillaume Audas, Chateaubriant (FR)

(73) Assignees: Betek GmbH & Co. KG, Aichhalden (DE); Kuhn Huard S.A., Chateaubriant (FR)

( * ) Notice: Subject to any disclaimer, the term of this patent is extended or adjusted under 35 U.S.C. 154(b) by 0 days.

(21) Appl. No.: 15/724,453

(22) Filed: Oct. 4, 2017

(65) Prior Publication Data

US 2018/0116092 A1    May 3, 2018

Related U.S. Application Data

(63) Continuation of application No. PCT/EP2016/057365, filed on Apr. 4, 2016.

(30) Foreign Application Priority Data

Apr. 7, 2015  (KR) .................. 10 2015 105 237

(51) Int. Cl.
  *A01B 15/02*  (2006.01)
  *A01B 49/06*  (2006.01)
  *A01C 5/06*  (2006.01)

(52) U.S. Cl.
  CPC .............. *A01B 15/02* (2013.01); *A01B 49/06* (2013.01); *A01C 5/062* (2013.01)

(58) Field of Classification Search
  CPC ......... A01B 15/02; A01B 15/00; A01B 49/06; A01B 49/04; A01B 49/00; A01C 5/062; A01C 5/06; A01C 5/00
  See application file for complete search history.

(56) References Cited

U.S. PATENT DOCUMENTS

| | | |
|---|---|---|
| 3,259,087 A | 7/1966 | Horton |
| 4,132,181 A | 1/1979 | Smith et al. |
| 4,355,589 A | 10/1982 | Wetmore |
| 5,865,131 A | 2/1999 | Dietrich, Sr. et al. |
| 6,178,900 B1 | 1/2001 | Dietrich, Sr. |

FOREIGN PATENT DOCUMENTS

AU          500 515 B2      5/1979

OTHER PUBLICATIONS

International Search Report and Written Opinion (Application No. PCT/EP2016/057365) dated Aug. 9, 2016.
Canadian Office Action (Application No. 2,982,150) dated Jul. 30, 2018.

*Primary Examiner* — Christopher J. Novosad
(74) *Attorney, Agent, or Firm* — Burr & Brown, PLLC

(57) ABSTRACT

A soil-working system for an agricultural soil-working machine, comprising a base element, which is designed to hold a bottom element, wherein the bottom element has at least one cutting element, and comprising an injection element for introducing substances into the soil material to be worked, wherein the soil-working elements are detachably or undetachably connected to a carrier element of the soil-working machine, wherein the detachable connections form an interlocking and/or frictional connection and wherein the elements at least partially form a protection against abrasive wear in relation to each other.

19 Claims, 4 Drawing Sheets

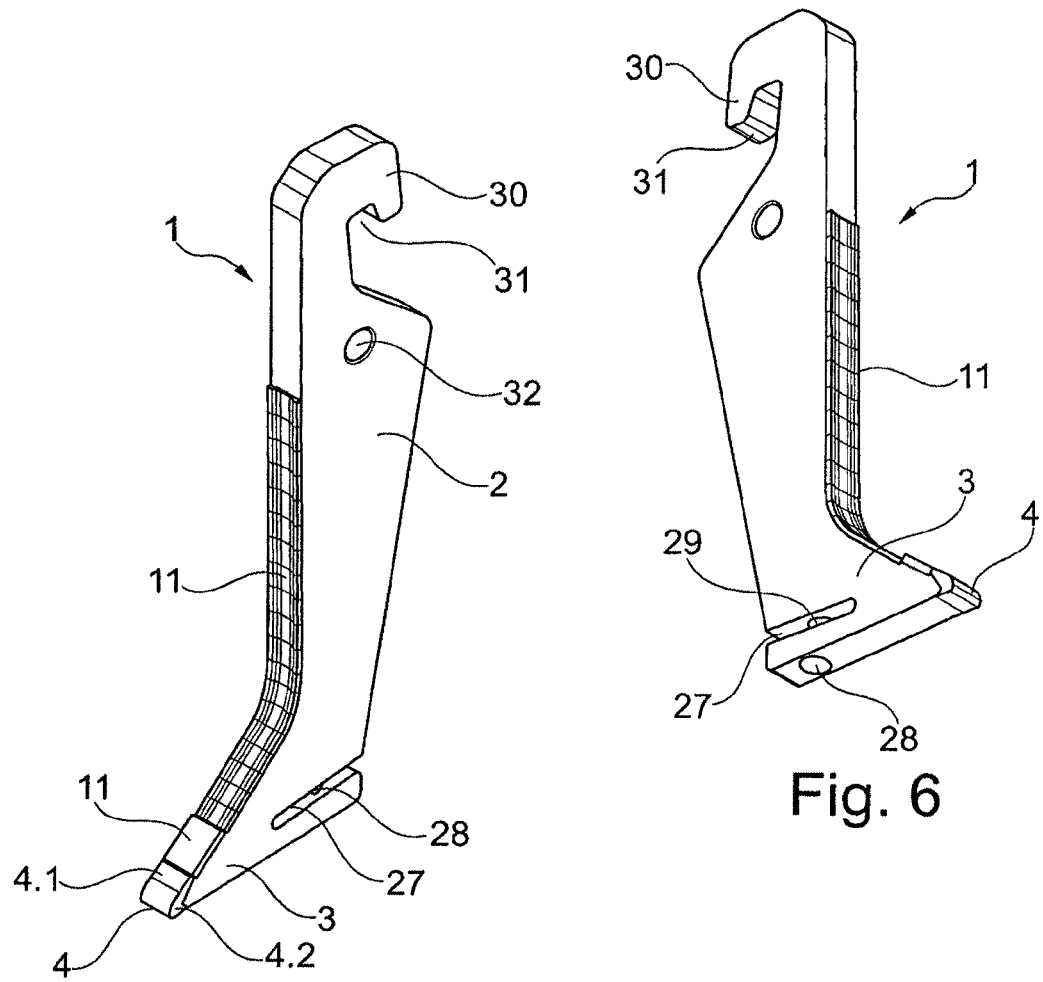
Fig. 5
Fig. 6
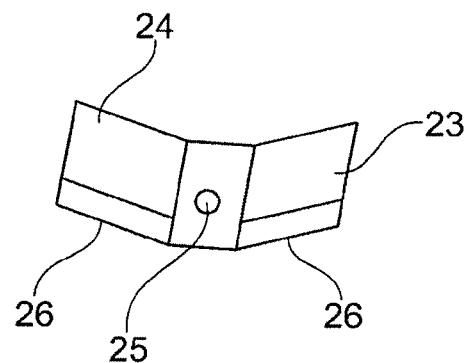
Fig. 7

SOIL-WORKING SYSTEM

CROSS REFERENCE TO RELATED APPLICATIONS

This application is a continuation of International Application No. PCT/EP2016/057365 filed Apr. 4, 2016, which designated the United States, and claims the benefit under 35 USC § 119(a)-(d) of German Application No. 10 2015 105 237.7 filed Apr. 7, 2015, the entireties of which are incorporated herein by reference.

FIELD OF THE INVENTION

The present invention relates to a soil-working system for an agricultural soil-working machine, comprising a base element for receiving a bottom element, wherein the bottom element has at least one cutting element, and comprising an injection element for introducing substances into the soil material to be worked, wherein the soil-working system is releasably connected to a carrier element, in particular, to a tine of an agricultural machine.

BACKGROUND OF THE INVENTION

A plurality of different systems for soil-working comprising an injection element for an agricultural soil-working machine are known from the prior art. Such systems often have a complex mechanical construction which during the use of the soil-working system requires a time-consuming and expensive replacement of the respective elements due to abrasive wear of the individual elements.

Moreover, in some cases the individual elements of the soil-working system have dimensions and/or shapes which are subjected to detrimental wear.

SUMMARY OF THE INVENTION

It is the object of the present invention to provide a soil-working system of the type mentioned in the introduction which eliminates the drawbacks of the soil-working systems known from the prior art.

The object of the present invention is achieved in that the soil-working system according to the present invention comprises a modular construction which markedly reduces abrasive wear of the elements.

Preferably, due to its dimensions, each element forms a protection for the element of the soil-working system respectively downstream in the direction of flow, wherein the shapes of the individual elements are specifically adapted to one another.

BRIEF DESCRIPTION OF THE DRAWINGS

The present invention is described in more detail hereinafter with reference to an exemplary embodiment shown in the drawings, in which:

FIGS. 5 and 6 show a soil-working tool for a soil-working system in different perspective views; and FIG. 7 shows a wing element for use on the soil-working tool according to FIGS. 5 and 6 in plan view.

DETAILED DESCRIPTION OF THE INVENTION

Figure 1:
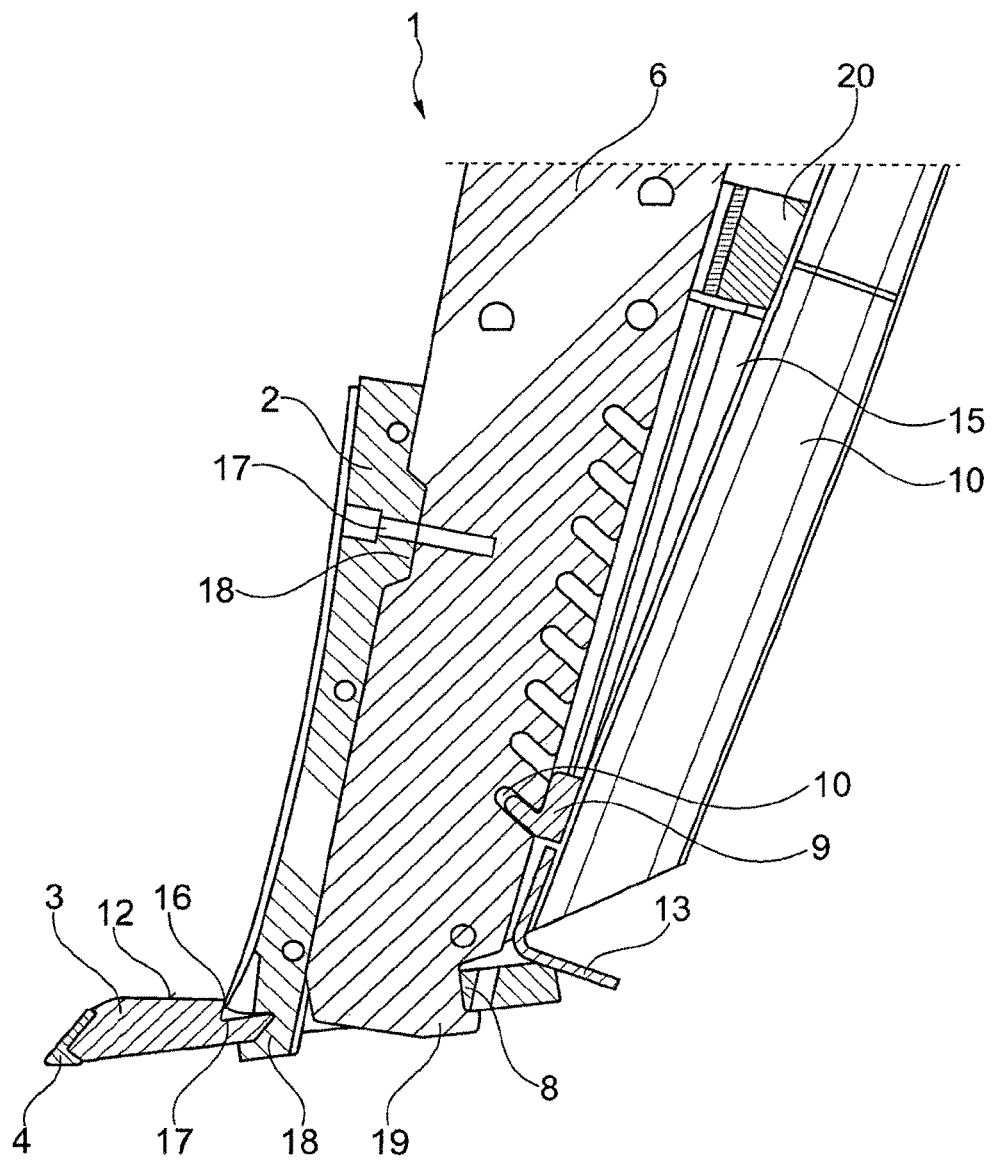
FIG. 1 shows the view of a soil-working system in side view with a base element, a bottom element, a carrier element and an injection element.

In FIG. 1 a soil-working system 1 according to the present invention is shown, wherein the soil-working system 1 comprises a base element 2, a bottom element 3 and an injection element 5, which elements 2, 3, 5 are arranged on a carrier element 6 of a soil-working machine via releasable connections.

The releasable connections of the soil-working system 1 are configured as positive and/or non-positive connections, wherein the base element 2 is arranged on the carrier element 6 by means of an additional screw connection 17 in the end region facing counter to the soil surface.

The base part on its surface facing counter to the working direction of the soil-working system 1 comprises at least one projection 18 and/or at least one indentation which are in positive and/or non-positive engagement with the at least one indentation and/or at least one projection correspondingly formed on the opposing surface. A further embodiment of the base element 2, on the surface facing counter to the working direction, may comprise two webs preferably extending horizontally in the lateral end regions of the base element 2, the webs laterally encompassing the carrier element 6 and/or engaging in indentations which are correspondingly configured on the surface of the carrier element 6. Further positive and/or non-positive connections between the base element 3 and the carrier element 6 which are based on the key-lock principle are possible.

The bottom element 3 comprises on its surface facing in the working direction at least one cutting element 4 which encompasses in an angular manner the tip of the bottom element 3 facing in the working direction and forms excellent protection against abrasive wear. Preferably at least one protecting element 12 is arranged on the surface of the bottom element 3 downstream in the direction of flow of the soil material, for increased protection from abrasive wear.

The bottom element 3 is penetrated on the surface facing counter to the soil surface by a recess 8, wherein the recess 8 advantageously comprises a shoulder 17 which is enclosed by a hook-shaped end region 18 of the base element 3 passing through the recess 8 and which forms a positive and non-positive connection and support.

Additionally, the recess 8 of the bottom element 3 is positively and/or non-positively engaged with an end region 19, which is configured to be hook-shaped, on the carrier element 6, wherein the enclosure of the hook-shaped end regions 17, 18 of the base element 2 and the carrier element 6 overall forms a positive and/or non-positive support of the elements 2, 6, which is additionally captively locked in position by the connection between the base element 2 and the carrier element 6 which is configured according to the key-lock principle.

An injection element 5 is arranged aligned with the carrier element 6 in the direction facing counter to the working direction, the injection element being configured for introducing injected substances, for example fertilizer or seeds.

The injection element 5 preferably has an angled guide element 13 on its end region facing the soil surface, the angled guide element in a first function forming a protection from soil material penetrating into the injection element 5, and in a second function forming an improved distribution of the substance introduced via the injection element 5 into the worked soil.

In the embodiment shown here, the injection element 5 has on its surface located in the end region in the vicinity of the soil at least one hook-shaped fastening element 9 which is positively and/or non-positively engaged with at least one receiver 8 configured in the carrier element 6.

Due to a plurality of receivers 8 which are formed, the spacing between the soil surface and the injection element 5 is able to be adjusted in a variable manner.

After arranging the injection element 5 on the carrier element 6, an additional releasable support and fastening is able to be implemented by means of a connecting element 20, wherein the connection of these two elements 6, 20 may also be implemented as a positive and non-positive connection.

Moreover, the arrangement of a wedge-shaped spacing and stabilizing element 15 is possible for improved support of the injection element 5.

Due to the relatively large spacing between the soil surface and the connecting arrangement 17 between the base part 2 and the carrier part 6, it is possible to avoid an undesired release of the base element 2 together with the bottom element 3 due to abrasive wear of a soil-working system 1 immersed in the soil material.

Moreover, in the embodiment of a soil-working system 1 shown here, an additional protection of the surface edge 16 is formed in the end region of the carrier element in which the end of the cutting element 4 facing counter to the working direction and the soil surface has a spacing from the soil surface which is equal to, preferably greater than, the spacing between the soil surface and the surface edge 16 of the base element 2 penetrating the bottom element 3. As a result, the surface edge is covered by the end of the cutting element 4 in the horizontal plane, whereby the surface edge is additionally protected from abrasive wear and a premature release of the base element 2 may be avoided.

Figure 2:
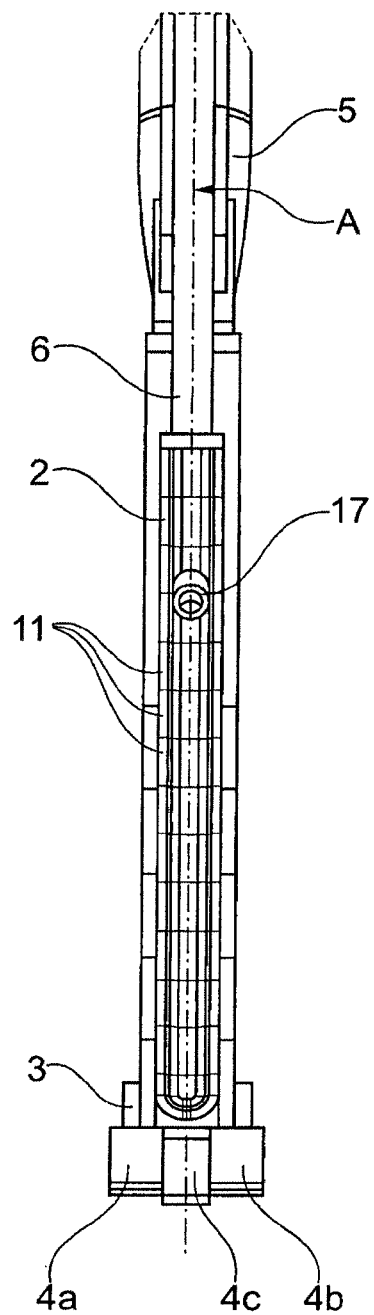
FIG. 2 shows the view of the soil-working system according to FIG. 1 in a principal view.
Figure 3:
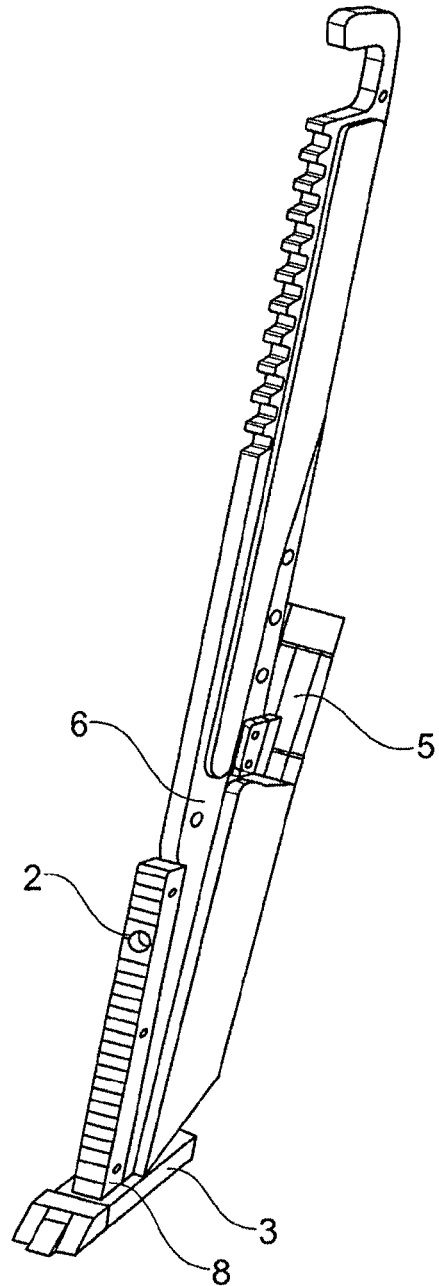
FIG. 3 shows the view of a soil-working system in a perspective view.

In each case an embodiment of the soil-working element according to the present invention is shown in FIG. 2 and in FIG. 3, wherein the base element 2 is coupled to the carrier element 6 and on its surface facing in the working direction comprises a plurality of successive protective elements 11. The arrangement and the shape of the protective elements 11 are variable, wherein the embodiment is able to be implemented in one piece and/or in multiple parts.

The cutting element 4 is configured in multiple parts in the embodiment shown here, wherein the multipart cutting elements 4a, 4b, 4c horizontally form a plane and in their plan view form planes arranged offset to one another. In this case the cutting elements 4a, 4b, 4c in the horizontal plane and in their resulting position in plan view are able to be arranged in a variable manner, depending on the type of soil material.

Figure 4:
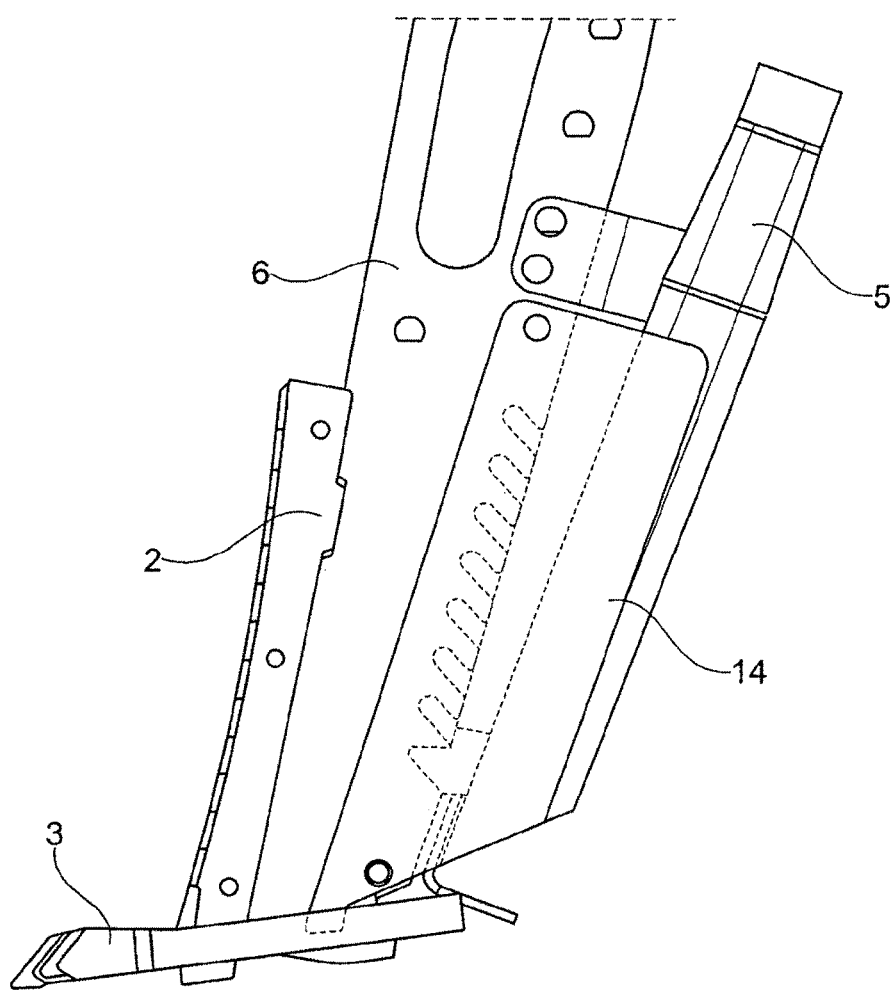
FIG. 4 shows the view of the soil-working system according to FIG. 3 in a perspective view.

In FIG. 4 a perspective view of the soil-working system 1 according to the present invention is shown, wherein in the view shown here [of] the soil-working tool a protecting and stabilizing element 14 is arranged laterally on the carrier element 6 and protects the injection element 5, which is connected to the carrier element 6 counter to the working direction, from abrasive wear.

In this case, the protecting and stabilizing element is preferably releasably connected to the carrier element 6 (also by means of a positive/non-positive connection).

A soil-working tool which may be connected to a carrier element 6 (not shown in the drawing) is shown in FIGS. 5 and 6. The soil-working tool has a base element 2, a bottom element 3 being integrally formed thereon. The bottom element 3 bears on its front face a cutting element 4 which faces in the direction of advance. The cutting element 4 is again of similar construction to the cutting elements 4 according to the exemplary embodiments according to FIGS. 1-4. Accordingly, the cutting element 4 has a fastening portion 4.1 which merges with a supporting portion 4.2 counter to the direction of advance. The cutting element 4 is connected to the bottom element 3 by means of a solder layer. In this case the solder layer is arranged in the transition region between the fastening element 4.1 and the supporting portion 4.2 with the bottom element 3. The cutting element 4 may consist of hard metal and thus has a defined service life. As an intermediary solder layer is arranged between the bottom element 3 and the fastening portion 4.1 and the supporting portion 4.2, the risk of rupture for the cutting element 4 is effectively reduced due to the support over the entire surface.

A protecting element 11 is attached onto the bottom element 3 adjoining the cutting element 4. The protecting element 11 preferably consists of hard metal and is designed as a plate-shaped element. In this case the protecting element 11 preferably adjoins the cutting element 4 without spacing. In this manner, an erosion of the transition region between the cutting element 4 and the protecting element 11 is prevented here. This is particularly significant at this point, in particular, since as a result of the high compression of the soil when inserting the tool this represents a point which is particularly at risk of wear. As FIG. 5 also shows, a series of further protecting elements 11 is attached, adjoining the plate-shaped protecting element 11. The protecting elements 11 in this case are also preferably arranged in series without spacing in order to prevent erosion. The protecting elements 11 have a groove-shaped geometry in cross section so that improved soil flow is achieved. On the rear, counter to the direction of advance a wing receiver 27 is incorporated in the bottom element 3. The wing receiver 27 is designed in the present case as a slot-shaped recess. A wing element may be inserted into the wing receiver 27, as shown in FIG. 7. As this view illustrates in more detail, the wing element has a central connecting region which is provided with a screw receiver 25. On both sides wings 23, 24 adjoin the connecting region. The two wings, as in the present case, may be positioned in a V-shape relative to one another. The wings 23, 24 have a blade 26 on their front face in the direction of advance. For mounting the wing element, the wing element is inserted from the rear into the wing receiver 27. In the mounted state, the screw receiver 25 is aligned with a screw receiver 28 of the bottom element 3. This screw receiver 28 is clearly visible in FIG. 6. Moreover, the two screw receivers 25 and 28 are aligned with a threaded receiver 29 which is cut into the bottom element 3. A screw may be passed through the two screw receivers 25 and 28 and screwed into the threaded receiver 29. As may be seen in FIG. 6, the screw receiver 28 is designed such that it receives the screw head countersunk in order to protect it from the abrasive action of the soil material. If the screw is tightened, preferably the design of the soil-working tool is such that the projection bearing the screw receiver 28 may be deflected in a resilient manner as a result of the screw force. Thus in addition to the screw connection the wing element is also braced in the slot-shaped wing receiver 27.

As may be identified further in FIGS. 5 and 6, the base element 2 is integrally formed on the bottom element 3. The base element 2 has, on its side remote from the bottom element 3, a holder receiver which in the present case may be designed, in particular, as a hook receiver 31. Accordingly, the hook receiver 31 is defined by a fastening portion 30. For mounting the soil-working tool shown in FIGS. 5 and 6, the soil-working tool is suspended by the hook receiver 31 on a hook of a carrier element 6, in particular on a plow beam. In this case, the soil-working tool is supported on the hook counter to the direction of advance, wherein corresponding surfaces of the hook receiver 31 become effective. In order to prevent the soil-working tool from slipping to the side from the hook, plate elements may be attached on both sides to the soil-working tool, the plate elements laterally covering the hook. The plate elements may be screwed together by using a screw receiver 32.

The invention claimed is:

1. A soil-working system for an agricultural soil-working machine, comprising: a base element which is designed to receive a bottom element, wherein the bottom element has at least one cutting element, and comprising an injection element for introducing substances into a soil material to be worked, at least the base element being releasably connected to a carrier element of the soil-working machine by at least one of a positive or a non-positive connection,
   wherein the base element and the bottom element at least partially form a protection against abrasive wear in relation to each other, and
   wherein the bottom element includes a recess defined therein which is positively and non-positively penetrated by the base element and the carrier element.

2. The soil-working system as claimed in claim 1, wherein the base element comprises at least one protecting element on a surface thereof facing in a working direction of the soil-working system.

3. The soil-working system as claimed in claim 1, wherein the base element comprises at least one of at least one projection or at least one indentation on a surface thereof facing counter to a working direction of the soil-working system.

4. The soil-working system as claimed in claim 1, wherein the injection element in an end region thereof facing counter to a soil surface comprises at least one fastening element which is at least one of positively or non-positively engaged with at least one receiver arranged in the carrier element.

5. The soil-working system as claimed in claim 1, wherein at least one protecting element is arranged on a surface of the bottom element facing counter to a soil surface.

6. The soil-working system as claimed in claim 5, wherein the protecting element is configured in one of multiple parts or in one material and for one of a symmetrical or an asymmetrical arrangement on the base part.

7. The soil-working system as claimed in claim 1, wherein an angled guide element is arranged in an end region of the injection element for protecting an injection opening from penetrating the soil material and for a uniform distribution of a substance evacuated during operation of the soil-working system.

8. The soil-working system as claimed in claim 1, wherein the injection element is connected to the carrier element by means of a protecting and stabilizing element.

9. The soil-working system as claimed in claim 1, wherein a wedge-shaped spacing and stabilizing element is arranged between the injection element and the carrier element.

10. The soil-working system as claimed in claim 1, wherein the cutting element arranged on the bottom element has a spacing from a soil surface with an end facing counter to a working direction and the soil surface, which is equal to or greater than a spacing between a surface edge of the base element penetrating the bottom element and the soil surface.

11. The soil-working system as claimed in claim 1, wherein the cutting element has a multipart configuration and is configured to be arranged in every spatial plane relative to the bottom element.

12. The soil-working system as claimed in claim 1, wherein an intermediate element is arranged between the base element and the carrier element.

13. The soil-working system as claimed in claim 12, wherein the intermediate element forms a releasable connection between the base element and the carrier element by means of at least one of at least one shaped portion or at least one shaped body.

14. The soil-working system as claimed in claim 1, wherein two outwardly oriented wing elements are arranged at least one of releasably or unreleasably on the bottom element.

15. The soil-working system as claimed in claim 1, wherein the base element comprises one or more internal threads.

16. The soil-working system as claimed in claim 1, wherein the base element has a one-piece or multi-part shape.

17. The soil-working system as claimed in claim 1, wherein an end region of the base element facing in a direction of flow of the soil material has a hook-shaped coupling.

18. The soil-working system as claimed in claim 1, wherein the base element has an S-shaped path, wherein an end region of the base part facing in a direction of flow of the soil material partially encompasses the carrier element, and a starting region of the base part facing in the direction of flow of the soil material forms a support on the carrier element.

19. A soil-working system for an agricultural soil-working machine, comprising a base element which is designed to receive a bottom element, wherein the bottom element has at least one cutting element, and comprising an injection element for introducing substances into soil material to be worked, at least the base element being unreleasably connected to a carrier element of the soil-working machine by at least one of a positive or a non-positive or a frictional connection,
   wherein the base element and the bottom element at least partially form a protection against abrasive wear in relation to each other, and
   wherein the bottom element comprises a recess which is positively and non-positively penetrated by the base element and the carrier element.

* * * * *

UNITED STATES PATENT AND TRADEMARK OFFICE
CERTIFICATE OF CORRECTION

PATENT NO. : 10,485,152 B2
APPLICATION NO. : 15/724453
DATED : November 26, 2019
INVENTOR(S) : Fabian Seifried et al.

Page 1 of 1

It is certified that error appears in the above-identified patent and that said Letters Patent is hereby corrected as shown below:

On the Title Page

Foreign Application Priority Data, Item (30):
Please change: "Apr. 7, 2015 (KR)..... 10 2015 105 237" to -- Apr. 7, 2015 (DE)..... 10 2015 105 237 --

Signed and Sealed this
Fourth Day of February, 2020

Andrei Iancu
*Director of the United States Patent and Trademark Office*